Jan. 3, 1950      H. W. EKHOLM      2,493,239

RAILWAY BRAKE BEAM STRUCTURE

Filed Jan. 12, 1948      2 Sheets-Sheet 1

INVENTOR:

HERBERT W. EKHOLM

BY Rodney Bedell

ATTORNEY.

Jan. 3, 1950 H. W. EKHOLM 2,493,239
RAILWAY BRAKE BEAM STRUCTURE
Filed Jan. 12, 1948 2 Sheets-Sheet 2
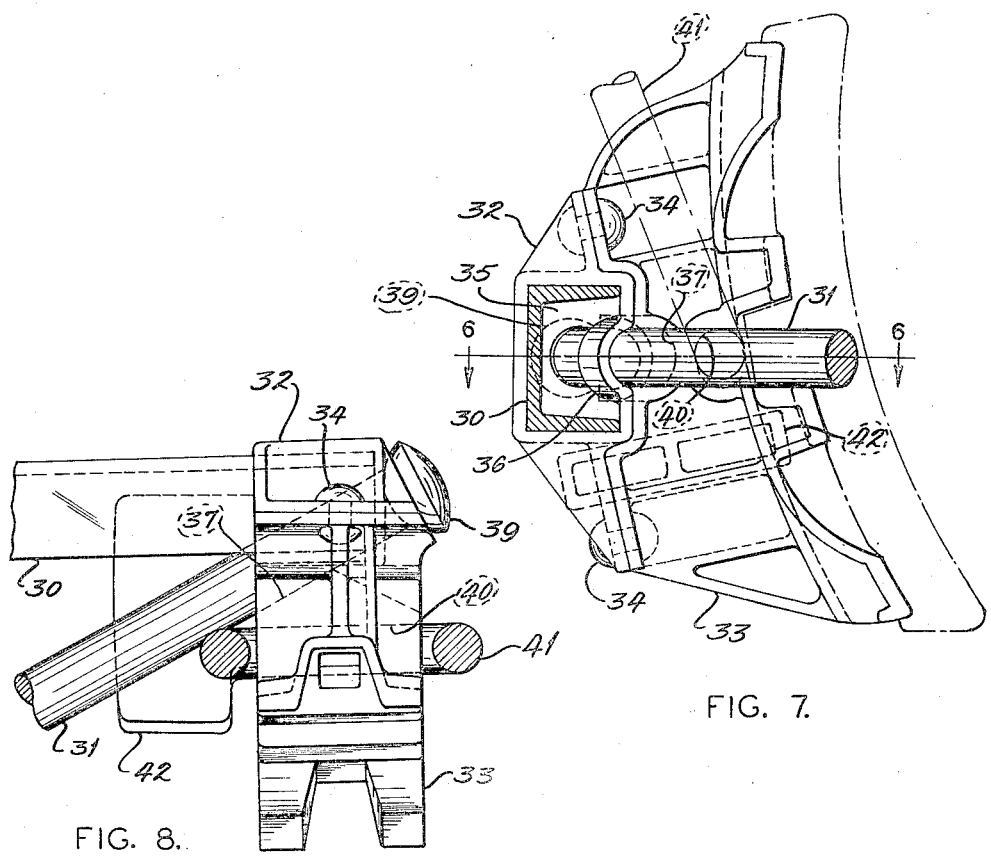
FIG. 7.
FIG. 8.
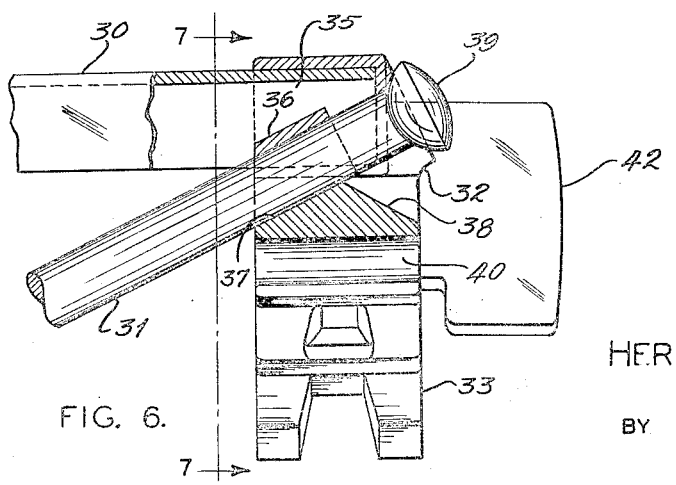
FIG. 6.
INVENTOR:
HERBERT W. EKHOLM
BY Rodney Bedell
ATTORNEY.

Patented Jan. 3, 1950

2,493,239

UNITED STATES PATENT OFFICE 2,493,239

RAILWAY BRAKE BEAM STRUCTURE

Herbert W. Ekholm, Chicago, Ill., assignor to Chicago Railway Equipment Company, Chicago, Ill., a corporation of Illinois Application January 12, 1948, Serial No. 1,830

13 Claims. (Cl. 188—233.3)

1

The invention relates to brake beams of the truss type in which compression and tension members converge near each end of the beam and mount end structure for carrying a brake shoe and for supporting the beam.

The main object of the invention is to adapt the end structure to be supported either by swinging on hangers suspended from the truck framing or by sliding on brackets on truck framing at the ends of the beam.

Another object is to provide a brake head having a seat for a brake beam hanger and having a part for mounting the beam from an adjacent truck frame bracket, the head being adapted for interchangeable assembly to either end of the beam with the bracket engageable part extending outwardly of the beam in functioning position when the head is assembled to one end of the beam, and with the bracket engageable part extending inwardly of the beam in non-functioning position when the head is assembled to the other end of the beam, the seat for the brake beam hanger being in functioning position at least when the part is in non-functioning position.

Another object is to utilize either a rod or strap tension member in a beam having the characteristics mentioned above.

These and other detail objects as will appear below are attained by the structure illustrated in the accompany drawings, in which:

Figure 6 shows another form of the invention and is a horizontal section taken approximately on the line 6—6 of Figure 7 through the right-hand end of a beam, the bracket engaging part being in functioning position.

Figure 7 is a transverse vertical section taken approximately on the line 7—7 of Figure 6.

Figure 8 is a top view of the right hand end of a brake beam as described above functioning as a hanger type and with the bracket engaging part in non-functioning position.

Figure 1:
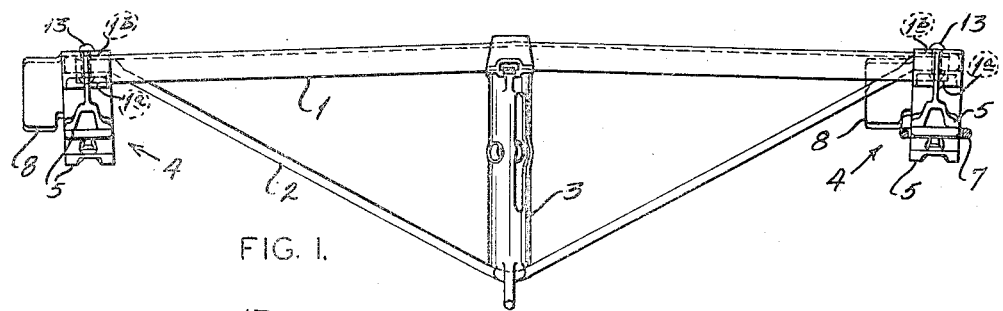
Figure 1 is a top view of a railway truss type brake beam constructed according to the invention, with the right hand end of the beam arranged to be supported by a hanger from the truck frame and with the left hand end adapted to be slidably mounted on an adjacent bracket on the truck framing.
Figure 2:
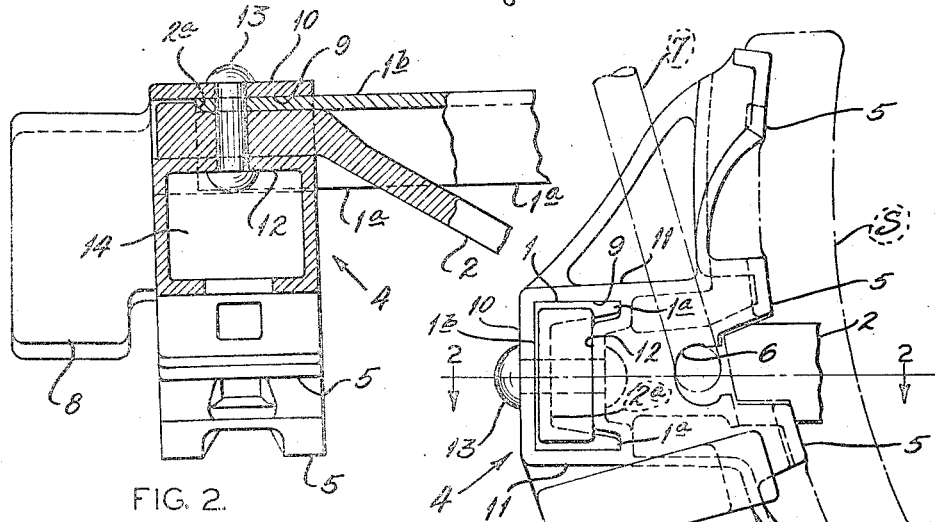
Figure 2 is a horizontal section taken approximately on the line 2—2 of Figure 3.
Figure 3:
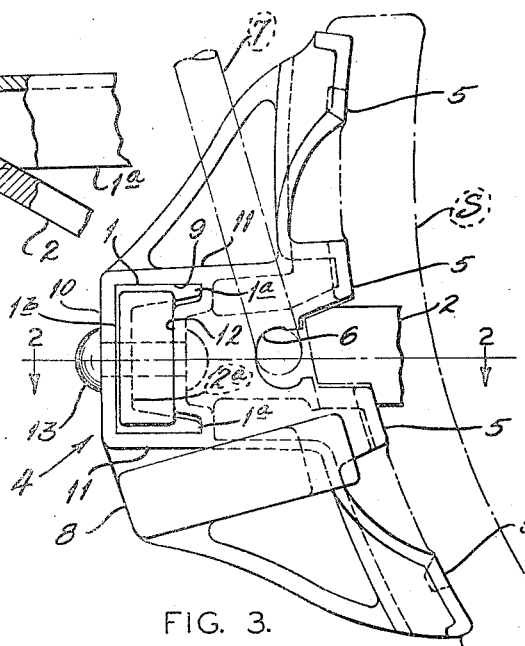
Figure 3 is an end view of the beam.

The beam shown in Figures 1 to 3 includes a compression member 1 of channel-shaped cross section, a tension member 2 of rectangular cross section, and a strut 3 intermediate the ends of the beam. The end portions of the compression and tension members converge, each end portion of the tension member being received between compression member flanges 1a and engaging the inner face of the compression member web 1b. A lip 2a on the end of the tension member is seated against the ends of the compression member web and flanges.

End structure comprising a brake head 4 is mounted on each end of the beam. Brake head 4 includes forwardly projecting toes 5, for mounting a brake shoe S, and a seat 6 for a hanger 7. A flat rectangular beam supporting part 8 normally extends outwardly longitudinally of the beam when in functioning position (as shown on the left-hand end of the beam in Figure 1) and is arranged to engage a supporting bracket (not shown) on the adjacent truck framing.

A passage 9 extends through the brake head and receives the ends of the tension and compression members. The back wall 10 of the passage engages the outer face of compression member web 1b and the top and bottom walls 11 of the passage engage the outer faces of compression member flanges 1a. The front wall 12 of the passage engages the forward edges of compression member flanges 1a and the forward face of tension member 2 and walls 10 and 12 maintain lip 2a in engagement with the end of compression member 1. A horizontally disposed rivet 13 passes through back and front walls 10 and 12 of brake head 4, through compression member web 1b, and through tension member 2 and maintains assembly of the beam. The forward end of rivet 13 extends into a recess 14 having an opening into seat 6 for bucking the forward end of the rivet during assembly of the beam.

Brake head 4 may be mounted on either end of the beam. When the brake head is mounted on the left-hand end of the beam with part 8 extending outwardly of the beam, the beam is of the hangerless type and may be slidably supported on an adjacent bracket on the truck framing. When head 4 is mounted on the right-hand end of the beam, part 8 extends inwardly of the beam and is in non-functioning position and the beam may be supported from the truck framing by hangers 7. Of course, in normal operation, a right-hand head and a left-hand head will be used so that when the heads are interchanged from one end of the beam to the other, the beam is supported at its ends by parts 8 or by hangers 7.

Figures 4, 5:
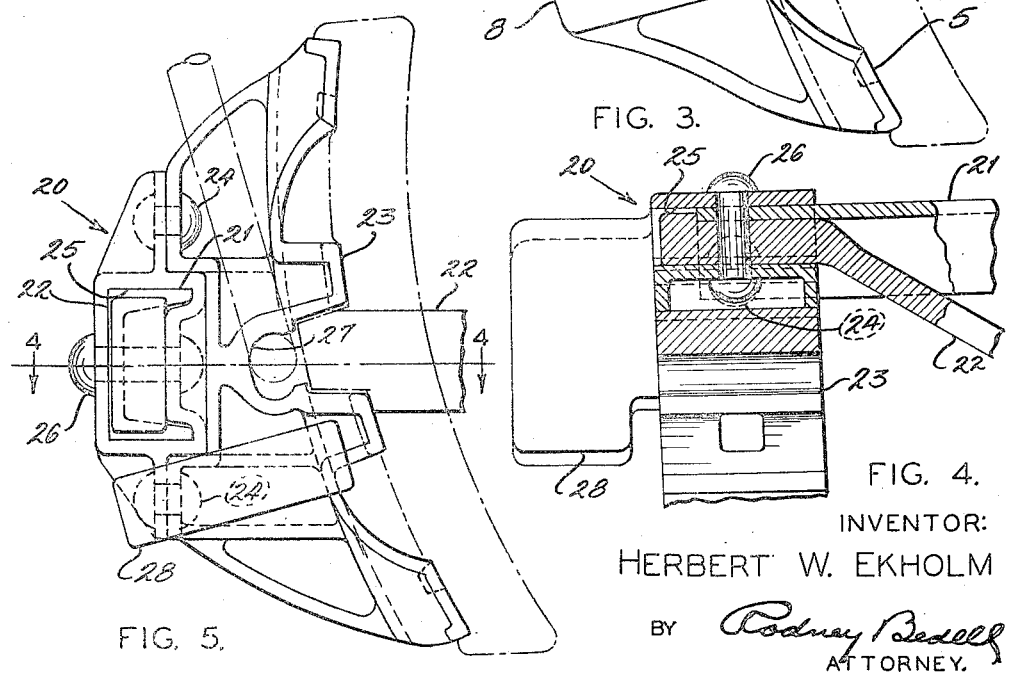
Figure 4 is a horizontal section taken approximately on the line 4—4 of Figure 5 and shows another embodiment of the invention.
Figure 5 is an end view of the beam shown in Figure 4.

In Figures 4 and 5, the end structure comprises an end member 20, mounted on the ends of the compression member 21 and tension member 22, and a brake head 23 secured to end member 20 by horizontal rivets 24. End member 20 has a passage 25 receiving the ends of the tension and compression members. A horizontal rivet 26 secures end member 20 to the ends of the compression and tension members. The brake head includes a seat 27 for the brake beam hanger and a part 28 for slidably supporting the beam from an adjacent truck frame bracket. The rear face of brake head 23 is recessed to receive end member 20 and the brake head may be mounted on the end member 20 at either end of the beam so the beam may be used either as a hanger or hangerless type beam.

In Figures 6, 7 and 8, the beam comprises a channel-shaped compression member 30 and a round rod tension member 31 with their end portions converging. The end structure comprises an end member 32 and a brake head 33 secured together by rivets 34 and mounted on the end portions of the compression and tension members. End member 32 has a passage 35 which opens forwardly of the beam and receives the end portions of the compression and tension members. An arcuate web 36 extends across passage 35 and confines the end portion of compression member 30 in the rear portion of the passage. Tension member 31 is confined between the forward concaved face of web 36 and a concaved rear face 37 of brake head 33 when the brake head is assembled to the right-hand end of the beam as shown in Figure 6. When the brake head is assembled to the left-hand end of the beam, concaved rear face 38 of the brake head cooperates with corresponding web 36 of an end member 32 at the opposite end of the beam to confine the other end of the tension member. The end portion of tension member 31 has an integral enlargement 39 seated on the outer face of end member 32.

Brake head 33 has a seat 40 for a brake hanger 41 and a part 42 for supporting the beam from an adjacent truck frame bracket. When brake head 33 is assembled to the right-hand end of the beam, as shown in Figure 6, the beam functions as a hangerless type and when a reverse head is assembled to the right-hand end of the beam, as shown in Figure 8, the beam functions as a hanger type.

The details of construction may be varied substantially without departing from the spirit of the invention, and the exclusive use of those modifications coming within the scope of the claims is contemplated.

What is claimed is:

1. In a railway truss type brake beam, a compression member and a tension member with their end portions converging, end structure at each end of the beam and mounted on said end portions and including a brake head having a seat for a brake beam hanger and having a part for slidably mounting the beam from an adjacent bracket, and having elements disposed to mount said head on either end of the beam, said part extending outwardly of the beam when said head is assembled to one end of the beam and said part extending inwardly of the beam when said head is assembled to the other end of the beam, said seat being in functioning position at least when said part extends inwardly of the beam.

2. In a railway truss type brake beam, a compression member and a tension member with their end portions converging, end structure at each end of the beam having a passage receiving the associated end portions and including a brake head having a seat for a brake beam hanger, and having a part for slidably mounting the beam from an adjacent bracket on the truck frame, and having elements disposed to mount said head on either end of the beam, said part being in functioning position when said head is assembled to one end of the beam, and said hanger seat being in functioning position when said head is assembled to the other end of the beam.

3. In a railway truss type brake beam, a compression member and a tension member with their end portions converging and interengaging, end structure at each end of the beam and having a passage receiving the associated end portions and maintaining said members is engagement with one another, said end structure including a brake head having a seat for a brake beam hanger, and having a part for slidably mounting the beam from an adjacent bracket on the truck frame, and having elements disposed to mount said head on either end of the beam, said part extending outwardly of the beam when said head is assembled to one end of the beam, and said part extending inwardly of the beam when said head is assembled to the other end of the beam, said seat being in functioning position at least when said part extends inwardly of the beam, and a securing device maintaining assembly of said end structure and said beam members.

4. In a railway truss type brake beam, a compression member and a tension member with their end portions converging, a brake head at each end of the beam and having a passage extending through said head and receiving the associated end portions, said head including a seat for a brake beam hanger and a part for slidably mounting the beam from an adjacent bracket, said passage being disposed to mount said head on either end of the beam with either end of said passage receiving said end portions, said part being in functioning position when said head is assembled to one end of the beam, and said part being in non-functioning position when said head is assembled to the other end of the beam, said seat being in functioning position at least when said part is in non-functioning position.

5. In a railway truss type brake beam, a compression member and a tension member with their end portions converging, a brake head at each end of the beam and having a passage extending through said head and receiving the associated end portions, said head including a seat for a brake beam hanger and a part for slidably mounting the beam from an adjacent bracket, said passage being disposed to mount said head on either end of the beam, said part being in functioning position when said head is assembled to one end of the beam and said part being in non-functioning position when said head is assembled to the other end of the beam, said seat being in functioning position at least when said part is in non-functioning position.

6. In a railway truss type brake beam, a compression member and a tension member with their end portions converging, end structure mounted on said end portions at each end of the beam and including an end member having a passage to receive said end portions, and a brake head having a seat for a brake beam hanger, and having a part for slidably mounting the beam from an adjacent truck frame bracket, and having elements disposed to mount said head on the end member at either end of the beam, said part extending outwardly of the beam when said head is assembled to one end of the beam and said part extending inwardly of the beam when said head is assembled to the other end of the beam, said seat being in functioning position at least when said part extends inwardly of the beam.

7. In a railway truss type brake beam, a compression member and a tension member with their end portions converging, structure at each end of the beam and comprising an end member having a passage with a forward opening and an arcuate web extending across said passage opening, and a brake head secured to said end member and opposing said web and closing said passage opening, said tension member being confined in said passage between said web and said brake head and said compression member being confined in said passage at the other side of said web, the end portion of said tension member being enlarged to prevent its withdrawal from said end member, said brake head having a seat for a brake beam hanger, and a part for slidably mounting the beam from an adjacent truck frame bracket, and having elements disposed to mount said head on the end member at either end of the beam, said part extending outwardly of the beam when said head is assembled to one end of the beam and said part extending inwardly of the beam when said head is assembled to the other end of the beam, said seat being in functioning position at least when said part extends inwardly of the beam.

8. In a railway truss type brake beam, a compression member and a tension member with their adjacent end portions converging, the end portions of said tension member being enlarged, an end member at each end of the beam and having a passage with a forward opening and receiving the associated end portions, and a brake head secured to said end member and closing said passage opening and maintaining assembly of said structure and said beam members, said head including a seat for a brake beam hanger, and a part for slidably mounting the beam from an adjacent bracket, and elements disposed to mount said head on the end member at either end of the beam, said part extending outwardly of the beam when said head is assembled to one end of the beam, and said part extending inwardly of the beam when said head is assembled to the other end of the beam, said seat being in functioning position at least when said part extends inwardly of the beam.

9. A brake head for a railway truss type brake beam comprising a seat for a brake beam hanger and a part for slidably mounting the beam from an adjacent truck frame bracket, there being a recess adapted to receive either end portion of the beam truss for assembling the head interchangeably to either end of the beam, with said part extending outwardly of the beam when the head is assembled to one end of the beam, and with said part extending inwardly of the beam when the head is assembled to the other end of the beam, said seat being in functioning position at least when said part extends inwardly of the beam.

10. A brake head for a railway brake beam comprising a seat for a brake beam hanger and a part for slidably mounting the beam from an adjacent truck frame bracket, there being a passage extending transversely through said head, said seat and said part being spaced from said passage, and said passage being arranged to assemble the brake head interchangeably to either end of the beam with said part in functioning position when the head is assembled to one end of the beam and with said seat in functioning position and with said part in non-functioning position when the head is assembled to the other end of the beam.

11. A railway truss type brake beam as described in claim 6, in which the end member maintains the tension and compression members assembled independently of the brake head, and the brake head is assembled to the end member independently of the tension and compression members.

12. End structure for a railway brake beam including an end member and a brake head, the head being detachably secured to the end member and having a seat for a brake beam hanger and having a part for slidably mounting the beam from an adjacent truck frame bracket, there being a passage extending through said end member independently of said head, said head having elements disposed to mount said head on said end member at either end of the beam, with said part in functioning position when said head is assembled to one end of the beam and with said part in non-functioning position when said head is assembled to the other end of the beam, said seat being in functioning position at least when said part is in non-functioning position.

13. End structure for a railway brake beam, including an end member and a brake head detachably secured thereto, said head having a seat for a brake beam hanger and having a part for slidably mounting the beam from an adjacent truck frame bracket, said end member and said head cooperating to provide a passage spaced from said seat and said part, said head passage being arranged to assemble the brake head interchangeably at either end of the beam with said part in functioning position when the head is assembled to an end member at one end of the beam and with said part in non-functioning position when said head is assembled to an end member at the other end of the beam, said seat being in functioning position at least when said part is in non-functioning position.

HERBERT W. EKHOLM.

REFERENCES CITED

The following references are of record in the file of this patent:

UNITED STATES PATENTS

| Number | Name | Date |
| --- | --- | --- |
| 955,239 | Williams, Jr. | Apr. 19, 1910 |
| 1,213,996 | Applebaugh, et al. | Jan. 30, 1917 |
| 1,313,982 | Chandler | Aug. 26, 1919 |
| 2,074,667 | Paterson | Mar. 23, 1937 |
| 2,398,917 | Busch | Apr. 23, 1946 |
| 2,419,115 | Busse | Apr. 15, 1947 |